US006616353B1

(12) United States Patent
Helkey

(10) Patent No.: US 6,616,353 B1
(45) Date of Patent: Sep. 9, 2003

(54) LASER INTENSITY NOISE SUPPRESSION USING UNBALANCED INTERFEROMETER MODULATION

(75) Inventor: Roger Helkey, Montecito, CA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 09/413,936

(22) Filed: Oct. 7, 1999

(51) Int. Cl.$^7$ .............................................. H04B 10/04
(52) U.S. Cl. ..................... 398/183; 356/450; 398/26; 398/186
(58) Field of Search .................. 359/161, 181, 359/140; 356/345, 450

(56) References Cited

U.S. PATENT DOCUMENTS

| | | | | |
|---|---|---|---|---|
| 4,769,853 A | * | 9/1988 | Goodwin et al. ............ 359/181 |
| 5,199,038 A | | 3/1993 | Vahala et al. .................. 372/33 |
| 5,373,383 A | | 12/1994 | LaGasse ...................... 359/161 |
| 5,424,863 A | * | 6/1995 | Gertel ......................... 359/173 |
| 6,304,369 B1 | * | 10/2001 | Piehler ..................... 359/337.4 |

FOREIGN PATENT DOCUMENTS

| | | |
|---|---|---|
| GB | 2 330 967 A | 5/1999 |
| WO | WO 96/37042 | 11/1996 |

OTHER PUBLICATIONS

K. Vahala et al., "Intensity noise reduction in semiconductor lasers by amplitude–phase decorrelation", Applied Physics Letters, p. 974–976, Sep. 3, 1990.
M. A. Newkirk et al., "Amplitude–phase decorrelation: a method for reducing intensity noise in semiconductor lasers", IEEE J. Quantum Electron., vol. QE–27, p. 13–22, 1991.
C. Bulmer et al., "Linear interferometric modulators in TiLiNbO3", IEEE Journal of Lightwave Technology, vol. LT–2, p. 512–521, 1984.

M. McAdams et al., "Effect of transmission through fiber gratings on semiconductor laser intensity noise", Applied Physics Letters, vol. 23, p. 3341–334'), Dec. 8, 1997.

G. Betts et al., "A linearized modulator for high performance bandpass optical analog links", IEEE MTT–S Symposium Digest, p. 1097–1100 (1994).

G. Betts et al., "Reflective linearized modulator", Integrated Photonics Research, OSA Technical Digest Series, vol. 6 (1996).

Goto, K. et al. "Etalon filter for direct detection receiver in optical intersatellite communications," Transactions of the Institute of Electronics, Information & Communication Engineers B–II, vol. J73B–11, No. 7, Jul. 1990, pp. 319–327. Japan.

* cited by examiner

Primary Examiner—Kinfe-Michael Negash
(74) Attorney, Agent, or Firm—Testa, Hurwitz & Thibeault, LLP

(57) ABSTRACT

An external modulation optical communication system suppressing the intensity noise of a semiconductor laser source by making substantially different optical path lengths for the optical paths in the interferometric modulator. Noise reduction is dependent on the correlation between intensity noise and frequency noise of the semiconductor laser. The interferometer path delay difference forms an optical filter that transforms frequency fluctuations into intensity fluctuations that are out of phase with the laser intensity fluctuations. The intensity modulation induced by frequency noise can be out of phase with the optical source intensity fluctuations, leading to total intensity noise at the output of the optical link which is lower than the laser intensity noise. Because the optical interferometer is already present for optical modulation, the optical filter realized by the unequal path delays of the interferometer does not add optical loss. A high correlation between intensity and frequency noise of the optical source is required for substantial intensity noise reduction.

11 Claims, 6 Drawing Sheets

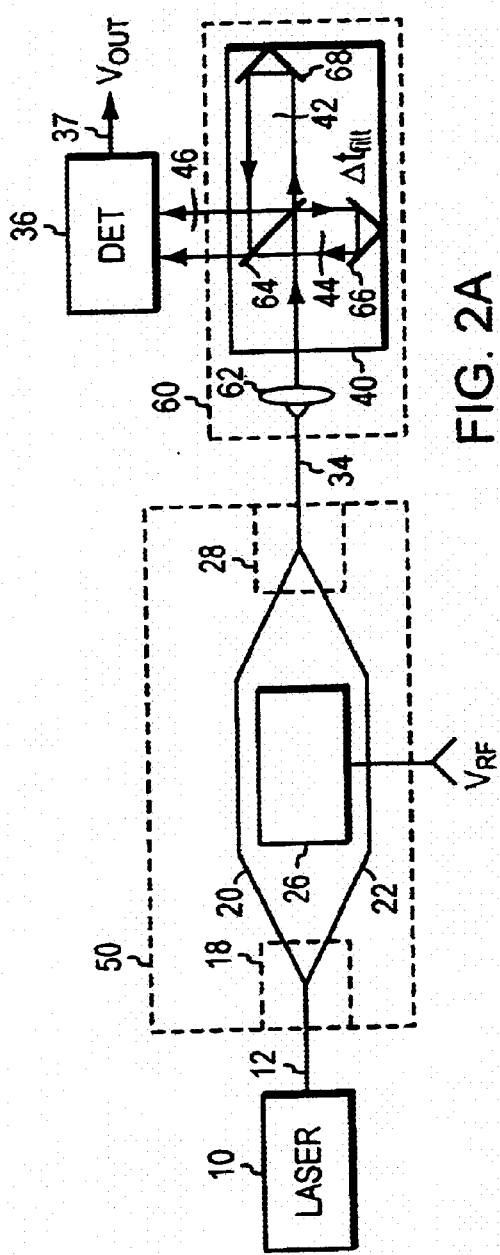
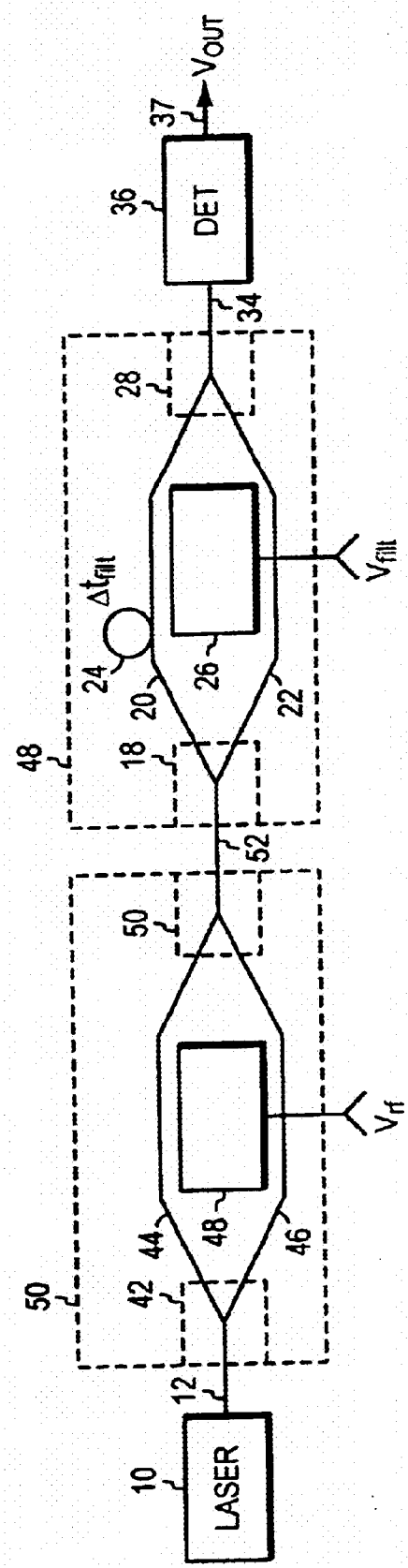
FIG. 2A
PRIOR ART
FIG. 2B

LASER INTENSITY NOISE SUPPRESSION USING UNBALANCED INTERFEROMETER MODULATION

STATEMENT REGARDING FEDERALLY SPONSORED RESEARCH

This invention was made with government support under Contract Number F19628-95-C-0002 awarded by the U.S. Air Force. The government has certain rights in the invention.

FIELD OF THE INVENTION

This invention relates generally to the field of optical signal transmission and in particular to the reduction of intensity noise in such systems.

BACKGROUND OF THE INVENTION

Semiconductor lasers generally are an inexpensive source of coherent optical power. Semiconductor lasers can be used in optical communication systems to transmit electrical signals over optical fiber using direct modulation or external modulation. In direct modulation, an electrical input signal modulates the bias current of the laser. In external modulation, a continuous-wave (CW) laser is used and the electrical input signal modulates the transmission of light through an optical modulator. Typically the modulator is an electro-optic crystal placed in an interferometer to convert phase modulation to intensity modulation.

The performance of optical systems using semiconductor lasers is degraded by the high intensity noise produced by the semiconductor laser. This intensity noise manifests itself as electrical noise at the output of the optical system. For high dynamic range applications such as communicating with remotely-located radar antennas, analog optical systems are required to have both low noise and low distortion. Typically, in optical communication systems an expensive Nd:YAG laser is used as the laser source due to its low noise. A semiconductor diode laser is potentially the lowest-cost laser source useful for external modulation, however, it requires noise suppression to be an effective optical source for communication systems using external modulation. The intensity noise of a semiconductor laser can be reduced by passing the light through an optical filter which has the appropriate variation in transmission as a function of wavelength.

In a semiconductor laser or semiconductor amplifier, fluctuations of the carrier density level that determines the material gain is the source of intensity noise. Changes in the carrier density change both the gain and refractive index of the gain medium. The ratio between the real part of the refractive index to the imaginary part of the refractive index (which is proportional to the gain) is defined as the linewidth enhancement factor a. When the laser is modulated, a large linewidth enhancement factor a produces a large frequency modulation (FM) signal corresponding to the intensity modulation. Because of this correlation between gain and phase changes in the gain medium, carrier fluctuations also produce optical FM noise that is correlated with the intensity noise of the laser. Thus, if the optical signal is passed through an optical filter having the appropriate transfer function slope, the FM noise of the optical carrier generates correlated intensity variations at the output of the optical filter. These correlated intensity variations can be out of phase with the original intensity noise, leading to substantially lower total intensity noise.

An optical filter noise reduction technique has generally not been applied to semiconductor laser optical communication systems because the method as previously disclosed has not been suitable in such systems using direct modulation or external modulation links. This is because if the optical filter noise reduction technique were applied to a direct modulation link, the signal to noise ratio at the link output would be reduced because the modulation signal would be reduced by at least as much as the intensity noise. If this optical filter noise reduction technique were applied to an external modulation communication system, the optical insertion loss of the noise reduction filter can lead to unacceptable degradation of link performance. Therefore, what is needed is an external modulation configuration with an optical filter that has the appropriate transmission slope for noise reduction, but does not introduce optical insertion loss.

SUMMARY OF THE INVENTION

The invention relates to a method and apparatus for modulating the intensity and improving the noise figure of an optical source in an optical communication system. An optical filter is used to reduce phase correlated intensity noise in the system without adding optical insertion loss. The filter is included in an interferometer having unbalanced (i.e., unequal) path lengths and an internal phase modulator. The method and apparatus are suitable for laser sources in which the refractive index of the laser medium varies with a change in gain. For example, links using semiconductor diode laser sources can benefit from this method.

The apparatus includes an optical source and an interferometer. The interferometer includes an input port, an output port, a first optical path and a second optical path. The first and second optical paths are each in optical communication with the input port and the output port. The length of the second optical path differs from the length of the first optical path by a predetermined optical path length difference. The apparatus also includes a modulator having a modulator electrical input. The modulator is located in the second optical path of the interferometer. The modulator generates an optical phase delay in response to a signal received at the modulator electrical input. The interferometer provides an optical signal having reduced phase correlated intensity noise in response to the predetermined optical path length difference.

In one embodiment the optical source is a semiconductor laser diode. In another embodiment the apparatus includes a detector in optical communication with the interferometer output port. In another embodiment the predetermined optical path length difference is adjustable.

In one embodiment the apparatus includes a reflective element in which receives radiation transmitted by the first and second optical paths through the output port. The received radiation is reflected back into the output port and transmitted back through the first and second optical paths.

The method includes the steps of providing a source of optical radiation having intensity noise, splitting the optical radiation from the source into a first optical signal and a second optical signal, and delaying the optical phase of the second optical signal relative to the first optical signal by a predetermined phase delay. The method also includes the steps of modulating the phase of the first or second optical signal in response to an electrical signal and combining the first and second optical signals to generate an output optical signal having a reduced intensity noise. In one embodiment the predetermined phase delay produces a periodic variation in interferometer output intensity as a function of wavelength that is an integer multiple of the mode spacing of the optical source.

BRIEF DESCRIPTION OF THE DRAWINGS

FIGS. 2A and 2B are highly schematic diagrams of an embodiment of an external modulation communication system using an unequal path length Michelson interferometer filter and an unequal path length Mach-Zehnder interferometer filter, respectively, for optical noise reduction.

DETAILED DESCRIPTION OF THE INVENTION

Figure 1:
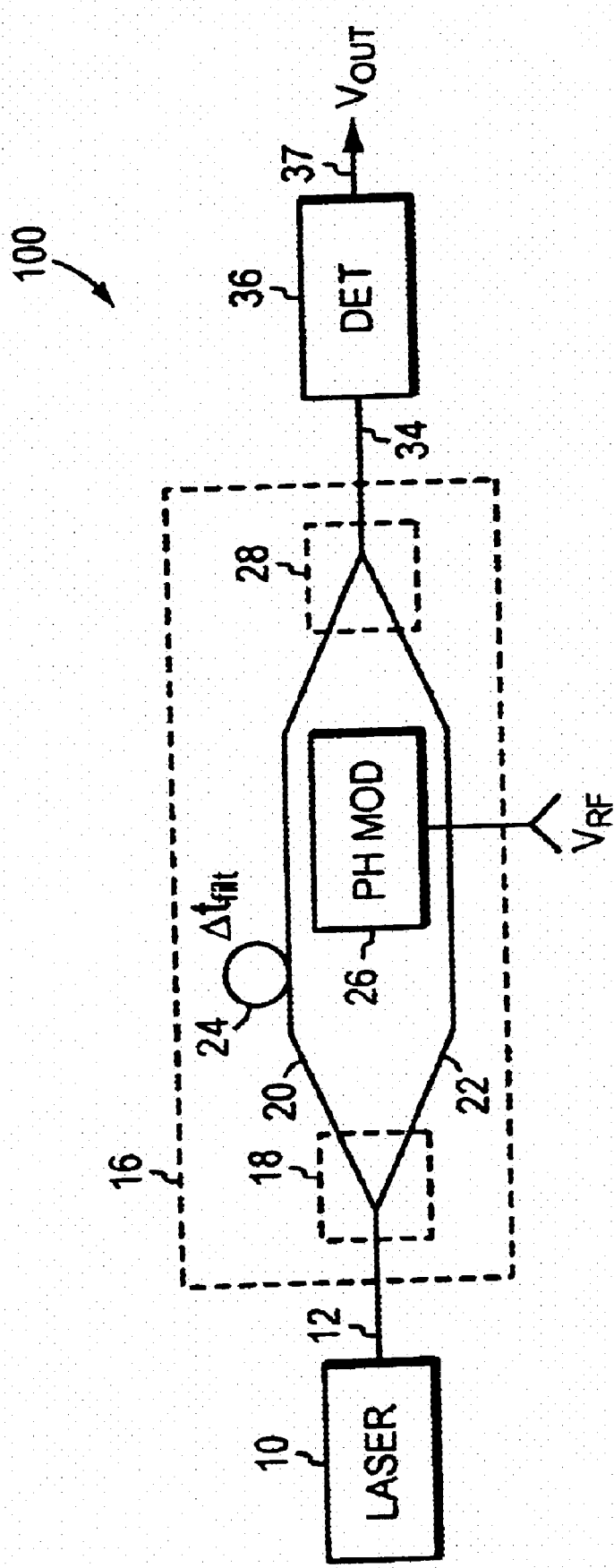
FIG. 1 is a highly schematic diagram of an embodiment of an external modulation communication system constructed according to the present invention.

Referring to FIG. 1, an unbalanced interferometer external modulation communication system 100 includes a laser source 10, a Mach-Zehnder modulator 16 having paths 20 and 22 of unequal optical path lengths due to path length difference 24, a phase modulator 26 and a detector 36. The phase modulator 26 provides a differential phase shift between the optical signals in the two paths 20 and 22 in response to an electrical signal $V_{RF}$. The detector 36 converts the modulated optical output signal from the interferometer 16 to an electrical output signal $V_{OUT}$ at the detector output 37. The laser 10 provides light with correlated intensity and frequency noise. The laser 10 can be a semiconductor laser or other type of laser and can include an optical amplifier such as a semiconductor optical amplifier. Typically, the laser source 10 includes an optical isolator (not shown) to reduce the power of reflections from components in the communication system 100 from returning to the laser source 10 and degrading its performance.

In one embodiment the Mach-Zehnder modulator 16 is formed from two waveguides in an electro-optic substrate. Light from the laser source 10 is transmitted through an optical fiber 12 to an optical power splitter 18. The light is directly coupled into the optical power splitter 18 by close proximity or physical contact between the optical fiber 12 and the electro-optic substrate. In another embodiment, the optical fiber 12 is coupled to the optical power splitter 18 with an external lens or a lens attached or formed on the end of optical fiber 12. The optical power splitter 18 directs approximately half the laser source output power into each of the two optical paths 20 and 22. One path 20 has additional optical delay due to additional waveguide length 24. This additional path length results in a wavelength dependence in the transfer function used as the optical filter for noise reduction.

In one embodiment, the substrate is an electro-optic material such as lithium niobate ($LiNbO_3$). The electrical signal $V_{RF}$ is applied to one or more electrodes on the substrate. The electrodes produce an electric field in the electro-optic substrate proportional to the electrical signal $V_{RF}$ resulting in a relative phase delay between the two unequal optical paths 20 and 22. The two optical paths 20 and 22 are interferometrically combined in an optical power combiner 28. The optical power splitter 18 and combiner 28 can be formed from optical fiber couplers, other dielectric waveguide couplers, Y-branch splitters, multi-mode interference couplers, or partially reflecting mirrors. The optical power combiner 28 is coupled into an optical fiber 34. The modulated optical output from optical fiber 34 is converted to an electrical signal by detector 36. The detector can be any device used to convert the intensity modulation of the optical signal into an electrical signal, including for example semiconductor photodiodes and phototransistors.

The optical bandwidth of the Mach Zehnder noise reduction filter 16 is set by the optical delay difference ($\Delta t_{filt}$) between the two optical paths 22 and 24 in the interferometer 16. A short delay difference $\Delta t_{filt}$ results in a very broadband optical filter bandwidth and, conversely, a large delay difference $\Delta t_{filt}$ results in a narrow filter bandwidth. The amount of FM to intensity modulation conversion depends on the local slope of the noise-reduction optical filter 16 or, equivalently, the change in optical transmission of the noise-reduction optical filter 16 as a function of the change in wavelength. This FM to intensity conversion efficiency is determined mainly by the optical path delay difference $\Delta t_{filt}$ which can be many optical wavelengths, however, the filter slope is also sensitive to small changes in $\Delta t_{filt}$ on the order of an optical wavelength. If the change in $\Delta t_{filt}$ is on the order of an optical wavelength then the relative optical phase between the two paths 22 and 24 is sufficiently changed so that the average optical transmission of the filter 16 is generally changed.

A modulated output signal from a conventional Mach-Zehnder modulator 50 transmitted through an optical fiber 34 to an external optical filter 60 used by the prior art to reduce intensity noise from the laser source 10 is shown in FIG. 2A. The optical noise reduction filter 60 includes a lens element 62 and a Michelson interferometer 40 constructed of free space optical elements 64, 66 and 68. The lens 62 converts the output of the optical fiber 34 to a collimated beam that is incident on a freespace optical power splitter 64. The optical power splitter 64 splits the free space optical beam into two approximately equal power optical beams 42 and 44. Optical reflectors 66 and 68 reflect the optical beams back to the optical power splitter 64 which also acts as an optical power combiner by interferometrically summing the two reflected beams 42 and 44 into a single noise-filtered optical beam 46. The photodetector 36 converts the modulated, noise-filtered optical beam to a modulated electrical signal $V_{OUT}$ at the detector output 37.

The Michelson interferometer 40 of FIG. 2A can be replaced with a Mach-Zehnder noise reduction filter 48 as shown in FIG. 2B. A second Mach-Zehnder interferometer 50 similar to the Mach-Zehnder interferometer 50 of FIG. 2A is used to modulate light from the source optical fiber 12 in response to an electrical input signal $V_{RF}$. Although the output of the Mach-Zehnder modulator 50 is shown coupled by an optical fiber 52 to the Mach-Zehnder optical filter 48 on a separate substrate, the Mach-Zehnder modulator 50 can be monolithically integrated on the same substrate as the Mach-Zehnder filter 48. An electrical control input ($V_{filt}$) to the phase modulator 26 sets the relative transmission of the Mach-Zehnder optical filter 48 at the optical wavelength of the laser source 10. The optical output signal from the optical filter 48 is transmitted through optical fiber 34 and converted to an electrical output by the photodetector 36.

Referring back to FIG. 1, a noise-reduction optical filter according to the present invention combines the Mach-Zehnder optical modulator 50 used for intensity modulation and the Mach-Zehnder optical filter 48 for optical filtering in FIG. 2B into a single interferometer 16. By combining the filter 48 and the modulator 50, the total optical loss introduced in the system can be reduced to that of the intensity modulator 50. This gives a system noise performance which is equivalent to using a lower intensity noise optical source without reducing the optical power received at the photodetector 36. A disadvantage of previous optical filter noise reduction implementations is that the optical filter 16 must have some slope in its optical transfer function, which means that there is necessarily some optical filter loss. For external modulation links, the optical filter loss results in a higher noise figure, lower gain and dynamic range, and additional components.

The transfer function of an interferometric modulator 50 is a sinusoidal function of its input electrical signal $V_{RF}$. Consequently, the nonlinear transfer function of the optical modulators 16, 48 and 50 shown in FIG. 1 and FIG. 2 generate undesirable distortion products. In order to reduce distortion, a number of linearization techniques can be implemented. One common technique is to introduce predistortion in the electrical signal $V_{RF}$ used to drive the intensity modulators. Similarly, postdistortion can be added to the link output signal $V_{OUT}$ by an electrical circuit which adds distortion to the electrical signal $V_{OUT}$ to reduce or cancel the distortion of the optical link.

Figure 3A:
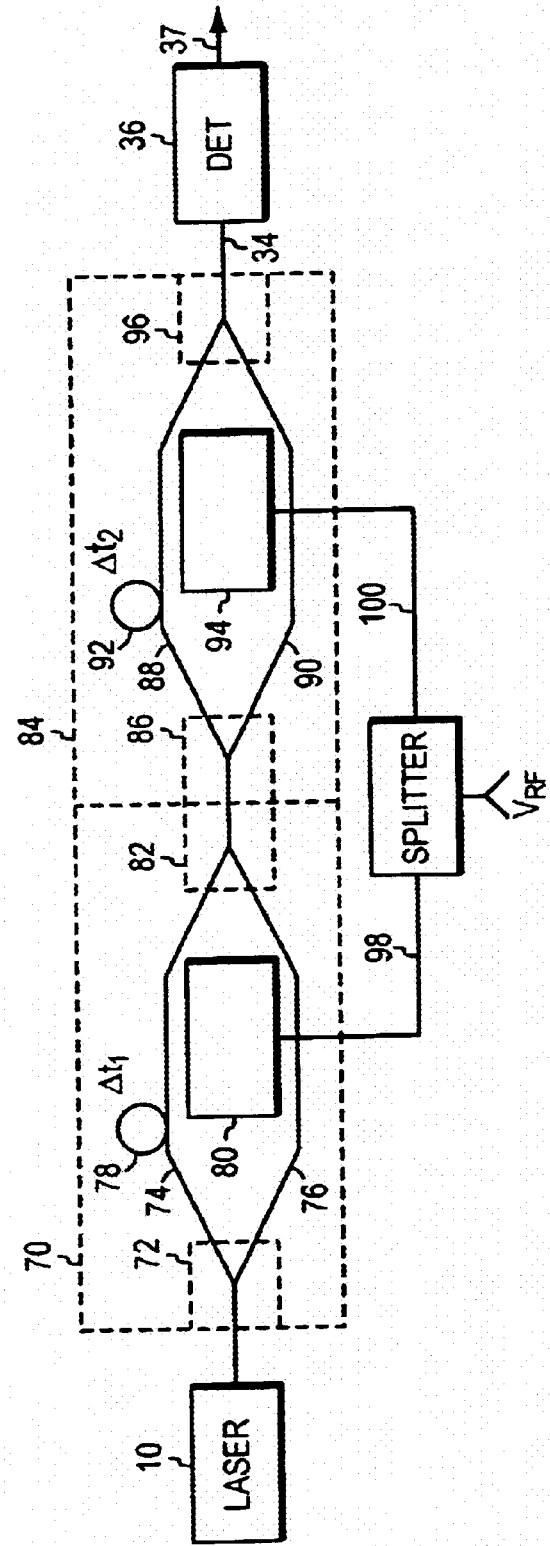
FIGS. 3A and 3B are highly schematic diagrams of an embodiment of an external modulation communication system using an unbalanced interferometer configuration utilizing a linearized series Mach-Zehnder modulator and a linearized reflective half-coupler modulator, respectively, according to the present invention.

Optical linearization is another technique for decreasing the distortion and increasing the dynamic range of external modulation links. Many optical linearization configurations use two optical components with nonlinearities of opposite signs that are summed together to give improved link linearity. One configuration for this technique uses a series of Mach-Zehnder modulators 70 and 84 with unequal path lengths as shown in FIG. 3A in place of the single Mach-Zehnder modulator 16 with unequal path lengths shown in FIG. 1. Light from the optical source 10 passes through two Mach-Zehnder modulators 70 and 84 in series. The electrical input signal $V_{RF}$ is split by an RF power splitter 96 and applied to both phase modulators 80 and 94. The third-order distortion component is completely cancelled with the appropriate splitting of the RF electrical input power and setting of the bias points (i.e., quiescent operating points on the voltage to intensity transfer function) for both phase modulators 80 and 94. Using unequal path delays 78 and 92 in one or both modulators results in a wavelength dependent optical filter transfer function useful for suppressing source intensity noise.

Figure 3B:
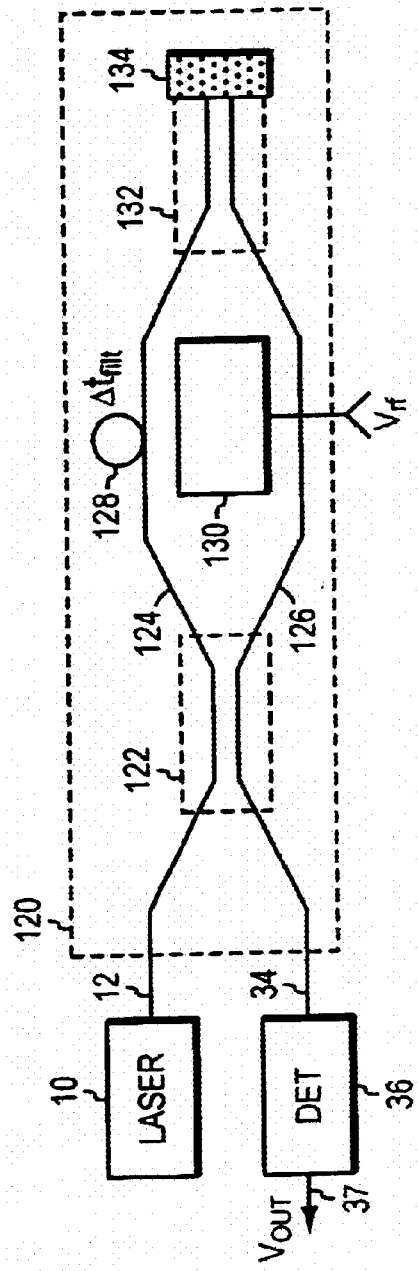

Referring to FIG. 3B, another configuration for optical linearization is based upon another unbalanced optical modulator 120 that includes an optical reflective element 134. The output of the laser source 10 is coupled by an optical fiber 12 to an optical directional coupler 122 at the input of the half-coupler modulator 120. The optical directional coupler 122 is a bidirectional two-port device that couples the laser output to paths 124 and 126. A differential delay 128 is added to one optical path 124. A phase shifter 130 applies a phase shift difference between paths 124 and 126 proportional to the electrical input signal $V_{RF}$. The paths 124 and 126 are coupled together by a second bidirectional two-port optical coupler 132. Optical mirror 134 reflects the light from coupler 132 back through the coupler 132. The reversed light in paths 124 and 126 are formed of linear combinations of forward travelling light in paths 124 and 126, with additional phase shift due to phase shifter 130 and additional differential delay due to optical delay 128 in the reverse direction. Thus the amplitude of light travelling in a reverse direction in paths 12 and 34 are linear combinations of the amplitude of reverse travelling light in paths 124 and 126. Linearization properties of the half-coupler modulator 120 are dependent on the amount of coupling achieved by optical directional couplers 122 and 132, and the bias point set by the phase shifter 130.

Figure 4A:
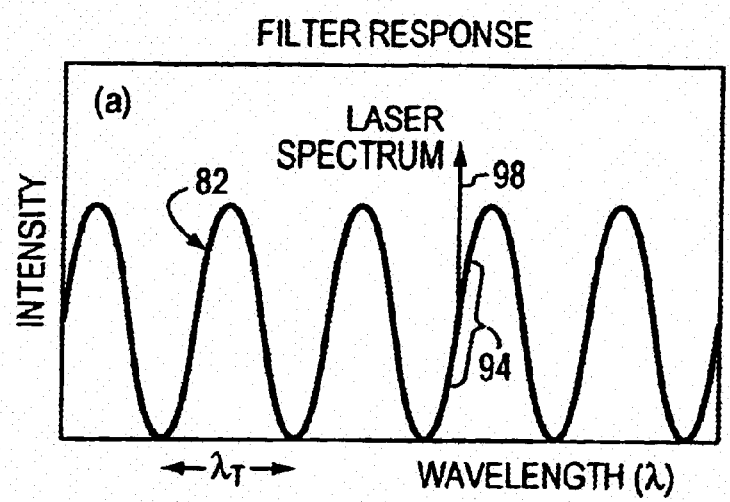
FIGS. 4A to 4C are diagrams of the transmission of the noise reduction optical filter and the spectrum of the optical source for an embodiment of the invention having an optical source having a single optical mode, a Fabry-Perot laser source having an optical mode spacing equal to the optical filter periodicity, and a Fabry-Perot laser source where the optical filter periodicity is equal to an integer multiple of the optical mode spacing of the Fabry-Perot laser, respectively.
Figure 4B:
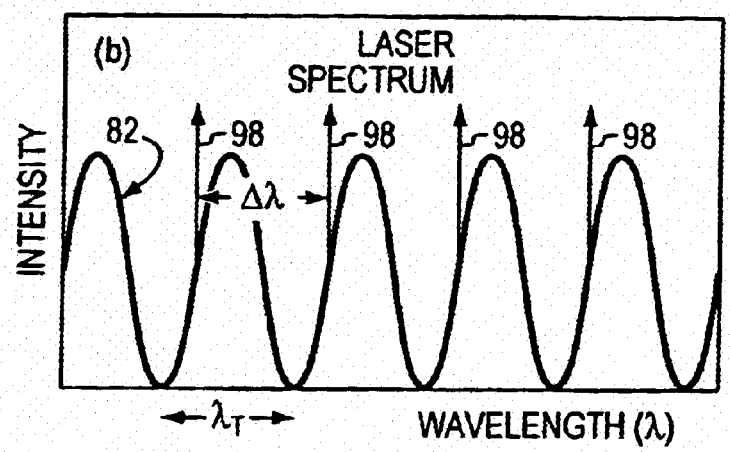
Figure 4C:
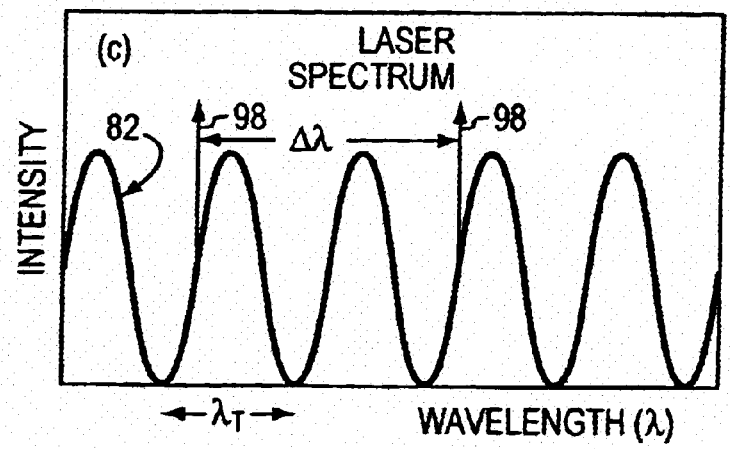

FIG. 4A shows the transfer function 82 of the optical signal generated with a single frequency optical source (e.g., a distributed feedback (DFB) laser) and a Mach-Zehnder modulator 16 or 48. A Fabry-Perot laser is easier and considerable less expensive to fabricate than the DFB laser, however, the Fabry-Perot laser produces multiple optical modes 98. Generally there will be a different optical filter slope 94 at the wavelength λ of each optical mode 98 of the laser 10. The transfer function 82 of an unequal path delay interferometer optical filter repeats periodically with a fixed optical frequency spacing T corresponding to a wavelength spacing of $\lambda_T$. The optical modes 98 of the Fabry-Perot laser are approximately equally spaced by Δλ in wavelength which corresponds the mode frequency separation. Thus a Fabry-Perot laser can be used as a source if the wavelength spacing $\lambda_T$ of the optical filter is equal to the wavelength spacing $\Delta\lambda$ of the laser optical modes 98 as shown in FIG. 4B. The wavelength spacing $\lambda_T$ of the optical filter can also be set to a multiple of the Fabry-Perot mode spacing $\Delta\lambda$ as shown in FIG. 4C.

Figure 5:
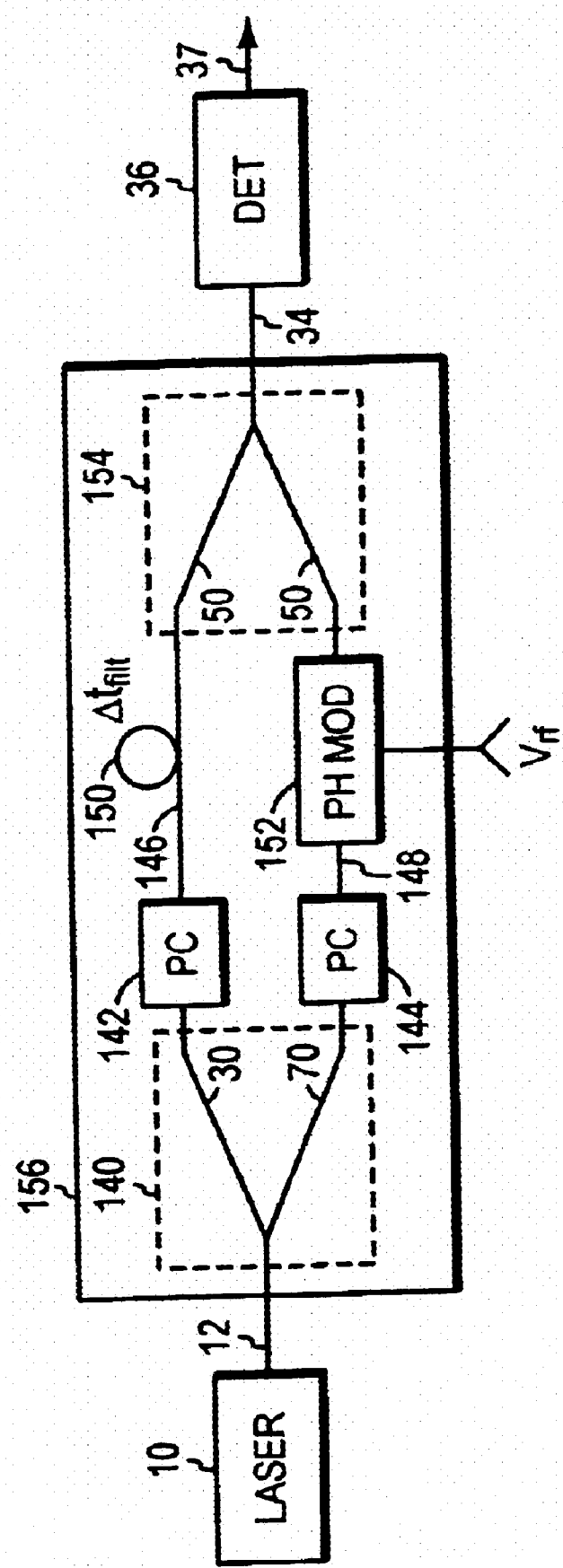
FIG. 5 is a highly schematic diagram of an embodiment of the present invention.

An experimental configuration for an embodiment of a noise-reduction optical filter using an unbalanced interferometer 156 is shown in FIG. 5. The laser source 10 is a 1.54 μm DFB laser (ORTEL, Alhambra, Calif., model no. 1740A). The Mach-Zehnder unbalanced interferometer 156 shown uses a fiber-optic splitter 140 and combiner 154. The input optical power splitter 140 has an unequal 30:70 optical power splitting ratio to compensate for the coupling loss of a fiber-coupled phase modulator 152 (Uniphase Telecom Products, Bloomfield, Conn., phase modulator model no. PM-150-005-00-1-1-B) in one path 148 of the interferometer. The fiber-optic combiner 154 has a 50:50 coupling ratio. An adjustable time delay unit 150 (Princeton Optics, Princeton, N.J., fiber optic delay line model no. 50-15-25) was used in one arm of the interferometer to vary the slope of the filter function. The half-wave voltage (i.e., the voltage required to delay one path of the interferometer relative to the other path by one-half the wavelength) of the phase modulator 152 is 1.3 V at 103 MHz.

In the absence of uncorrelated FM noise from the laser source 10, the total intensity noise in the optical signal in optical path 34 is the combination of the AM intensity noise of the laser source 10 and the intensity noise generated by the interferometer 156 from the correlated FM noise of the laser source 10. The total intensity noise is minimized by using an interferometer path length difference which is approximately equal to the path length difference required to minimize the modulation signal applied to the laser source 10. If the laser source 10 also has uncorrelated FM noise, the optical signal in optical path 34 includes a third noise component which is generated by the interferometer 156 from the uncorrelated FM noise of the laser source 10.

The intensity noise generated in the interferometer 156 by the FM noise in the laser source 10 is proportional to the optical path length difference selected with the time delay unit 150. The optimum path length difference for minimizing the total intensity noise is less for a laser source 10 having both correlated and uncorrelated FM noise components than for a laser source 10 having only a correlated FM noise component. The minimum total intensity noise achievable at the optimum optical path length difference is greater for a laser source 10 having both correlated and uncorrelated FM noise components than it is for a laser source 10 having only a correlated FM noise component.

Suppression of optical intensity noise resulting from a noise current injected into the laser source 10 was determined by intentionally modulating the laser source 10 and measuring the resulting modulation suppression. The laser source 10 was modulated at 103 MHz and the RF power was measured at the output 37 of the photodetector 36. The relative link gain is shown as a function of the path length difference in FIG. 6 for a laser bias of 27 mA and the interferometer 156 set at quadrature. The resulting detector photocurrent was 0.5 mA and the maximum modulation suppression was 5.7 dB. The upper curve 160 represents the modulation enhancement measured when the AM modulation resulting from the FM to AM conversion of the FM modulation is in-phase with the optical signal from the AM modulated laser source 10. The lower curve 162 represents the modulation enhancement measured when the AM modulation resulting from the FM to AM conversion is out-of-phase with the optical signal from the AM modulated laser 10. A maximum suppression of approximately 6 dB is achieved. As the differential path length increases beyond the 6 dB suppression length (not shown), the modulation enhancement for the out-of-phase conversion 162 increases because the total modulation is dominated by the converted FM modulation which is proportional to the differential path length.

Figure 7:
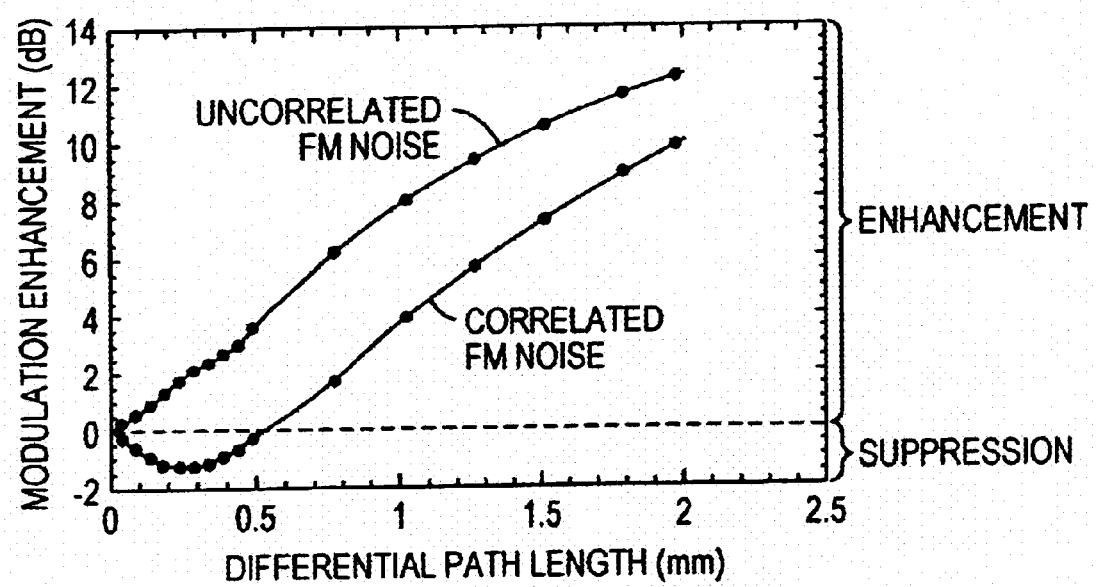
FIG. 7 is a graph of the measured noise enhancement of the optical filter noise reduction circuit as a function of the interferometer path length difference for the embodiment of the invention shown in FIG. 5.

The excess noise at the photodetector 36 measured using a noise figure meter is shown as a function of the difference in interferometer path lengths in FIG. 7. Excess noise is defined as the difference between the total output noise and the thermal noise. For a laser bias of 27 mA and detector photocurrent of 0.5 mA, the maximum noise suppression was 1.3 dB. For the unbalanced modulator configuration, there is no extra loss (i.e., insertion loss) from the insertion of an optical filter element therefore the link gain does not change when the optical path lengths are different. Consequently, the improvement in link noise figure is 1.3 dB, the same as the reduction in excess noise due to the optical filtering performed by the unbalanced interferometer 156.

Figure 6:
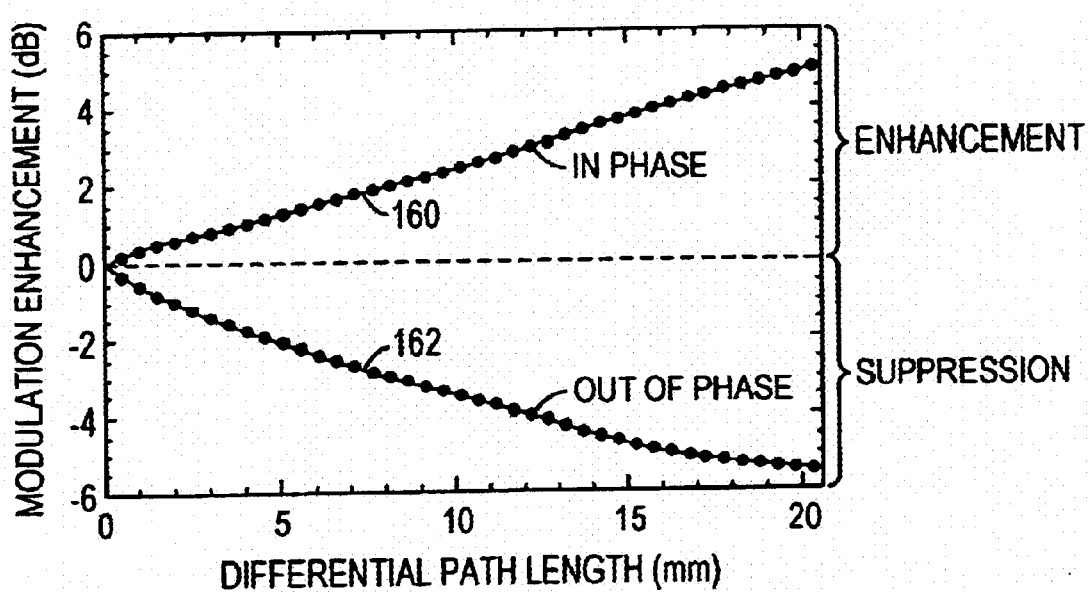
FIG. 6 is a graph of the measured modulation enhancement of the optical filter noise reduction circuit as a function of the interferometer path length difference for the embodiment of the invention shown in FIG. 5.

For perfect correlation between intensity noise and FM noise, the amount of relative intensity noise reduction in FIG. 7 is equal to the amount of suppression of modulation from the injected modulation signal used in the measurements of FIG. 6. The path length difference for optimum noise suppression, however, turns out to be much shorter than that for optimum modulation suppression because the uncorrelated FM noise of the laser source 10 causes the total intensity noise to increase for larger path length differences. This correlation between intensity noise and FM noise typically degrades at higher optical power.

While the invention has been particularly shown and described with reference to specific preferred embodiments, it should be understood by those skilled in the art that various changes in form and detail made be made therein without departing from the spirit and scope of the invention as defined by the appended claims.

I claim:

1. An optical system for reducing the intensity noise of an optical source comprising:

a source of radiation, said radiation having a wavelength and a phase correlated intensity noise;

an interferometer comprising:

an input port in optical communication with said source;

a first optical path in optical communication with said input port and having a first optical path length;

a second optical path in optical communication with said input port and having a second optical path length, said second optical path length differing from said first optical path length by a predetermined optical path length difference substantially greater than said wavelength; and an output port in optical communication with said first and second optical paths; and a modulator disposed in said second optical path and having a modulator electrical input, said modulator generating an optical phase delay in response to a modulator drive signal received at said modulator electrical input, wherein said interferometer provides an optical signal having reduced phase correlated intensity noise at said output port in response to said radiation and said predetermined optical path length difference, said predetermined optical path length difference selected to substantially reduce said phase correlated intensity noise.

2. The optical system of claim 1 wherein said predetermined optical path length difference is adjustable.

3. The optical system of claim 1 wherein said optical source is a semiconductor diode laser.

4. The optical system of claim 1 wherein said interferometer is monolithically fabricated from an electro-optic material.

5. The optical system of claim 1 further comprising a detector in optical communication with said output port.

6. The optical system of claim 5 further comprising an optical filter disposed between said source and said detector, said optical filter reducing said optical bandwidth of said detector.

7. The optical system of claim 1 wherein said radiation is transmitted through said first and second optical paths at least twice.

8. The optical system of claim 1 wherein said interferometer further comprises a reflective element in optical communication with said output port, said reflective element receiving said radiation transmitted in said first and second optical paths and reflecting said radiation back into said output port and through said first and second optical paths.

9. A method of optical noise reduction in an optical link, comprising the steps of:

providing a source of optical radiation having intensity noise;

splitting said optical radiation from said source to generate a first optical signal and a second optical signal;

delaying the optical phase of said second optical signal relative to said first optical signal by a predetermined phase delay;

modulating the optical phase of said second optical signal in response to an electrical signal; and combining said first optical signal and said modulated and delayed second optical signal to generate an output optical signal, wherein said output optical signal has a reduced intensity noise in response to said predetermined phase delay.

10. The method of claim 9 wherein the source of optical radiation produces a plurality of optical modes having a mode spacing.

11. The method of claim 10 wherein said predetermined phase delay produces a periodic variation in said output optical signal as a function of wavelength, said periodic variation being an integer multiple of said mode spacing.

* * * * *